US012641687B2

(12) United States Patent
Forti et al.

(10) Patent No.: US 12,641,687 B2
(45) Date of Patent: May 26, 2026

(54) INDUCTION HOB

(71) Applicant: ELECTROLUX APPLIANCES AKTIEBOLAG, Stockholm (SE)

(72) Inventors: Michele Forti, Forli (IT); Massimo Zangoli, Forli (IT); Laurent Jeanneteau, Compiègne (FR); Alex Viroli, Forli (IT)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 1051 days.

(21) Appl. No.: 17/772,550

(22) PCT Filed: Oct. 26, 2020

(86) PCT No.: PCT/EP2020/079988
§ 371 (c)(1),
(2) Date: Apr. 28, 2022

(87) PCT Pub. No.: WO2021/089350
PCT Pub. Date: May 14, 2021

(65) Prior Publication Data
US 2022/0386425 A1 Dec. 1, 2022

(30) Foreign Application Priority Data
Nov. 5, 2019 (EP) .................................... 19207325

(51) Int. Cl.
*H05B 6/06* (2006.01)
*H05B 6/12* (2006.01)

(52) U.S. Cl.
CPC ........... *H05B 6/065* (2013.01); *H05B 6/1272* (2013.01)

(58) Field of Classification Search
CPC .. C12Q 1/6804; C12Q 1/6806; C12Q 1/6809; C12Q 1/6844; C12Q 1/6883;
(Continued)

(56) References Cited

U.S. PATENT DOCUMENTS

| | | | | |
|---|---|---|---|---|
| 6,528,770 | B1 | 3/2003 | Akel et al. | |
| 11,304,267 | B2 * | 4/2022 | Ok | H05B 6/062 |
| 2021/0227644 | A1 * | 7/2021 | Bunya | H05B 6/1272 |

FOREIGN PATENT DOCUMENTS

| | | |
|---|---|---|
| EP | 2469970 | 6/2012 |
| WO | 2019092803 | 5/2019 |

OTHER PUBLICATIONS

Translation of WO2019092803, “Induction-Heating cooker”, May 16, 2019, By WIPO (Year: 2019).*
(Continued)

*Primary Examiner* — Quang T Van
(74) *Attorney, Agent, or Firm* — Chrisman Gallo Tochtrop LLC

(57) ABSTRACT

An induction-based cooking appliance includes multiple heating power transferring elements and multiple heating power energy units for powering the heating power transferring elements, each heating power energy unit including one or more power transistors for providing electrical power to the heating power transferring elements, wherein: the power transistors are wide bandgap transistors including semiconductor materials with a bandgap greater than 2 eV, and/or are configured to be operated in a first frequency range and in a second frequency range; or a first heating power transferring element is powered by a heating power energy unit including a first type of power transistor, adapted to be operated in a first frequency range, and a second heating power transferring element is powered by a heating power energy unit including a second type of power transistor, adapted to be operated in a second frequency range.

20 Claims, 1 Drawing Sheet

(58) Field of Classification Search
CPC . C12Q 2600/154; G06F 8/71; G06F 9/44505; G06F 9/44563; G06F 9/542; H04L 67/125; H04L 67/55; H04L 67/12; H05B 6/065; H05B 6/1272; Y02B 40/00
USPC ....... 219/620, 622, 624, 626, 660, 661, 662, 219/664, 665, 671
See application file for complete search history.

(56) References Cited

OTHER PUBLICATIONS

International Search Report and Written Opinion for PCT/EP2020/079988 dated Jan. 11, 2021, 7 pages.

* cited by examiner

INDUCTION HOB

The present invention relates generally to the field of induction-based cooking appliances. More specifically, the present invention relates to an induction hob, comprising at least one switching device, in particular wide bandgap power switching device, more in particular wide bandgap power transistor, configured to work at higher frequencies, in order to avoid acoustic noise.

BACKGROUND OF THE INVENTION

Cooking appliances based on induction technology are known in prior art.

Specifically, induction hobs are known which comprise multiple induction coils for providing an inductive coupling between the cookware item and the induction coil. For powering the induction coils, heating power energy units are used which mainly use insulated gate bipolar transistor (IGBT) technology.

Disadvantageously, known cooking appliances provide only limited capabilities of lowering or avoiding acoustic noise.

SUMMARY OF THE INVENTION

It is an objective of the embodiments of the invention to provide an induction-based cooking appliance with an improved possibility of avoiding acoustic interference noise. If not explicitly indicated otherwise, embodiments of the invention can be freely combined with each other.

It is known in the art that such household cooking hobs or cooking appliances usually are provided for conducting at least one cooking process comprising heating and/or cooling step, respectively. Such cooking process preferably at least comprises a heating step, e.g. frying, boiling, simmering or pouching of a foodstuff or a cooking liquid, respectively. For supporting the foodstuff or cookware item, it is particularly known to provide a cooking support, for example in the form of a cooking surface. Such cooking surface usually provides a support for the cookware items, for example, provided in the form of a plate element, particularly a glass or glass ceramic plate.

Preferably, the cooking hob comprises, preferably consists of, a cooking support and a lower casing. Thereby it is preferred that an open top side of the lower casing is covered by at least a part of the cooking support. The cooking support may be provided particularly as at least one panel, wherein preferably the panel is a glass ceramic panel. Preferably, at least one or more heating power transferring elements are arranged beneath the panel.

The lower casing may be manufactured from different material comprising plastics or metal, e.g. aluminum.

In particular, such casing may include a bottom wall and at least one sidewall. It is preferred that said casing is made of metal, e.g. aluminium or steel, and/or plastics, wherein preferably the casing made of metal is grounded.

Advantageously said lower casing may comprise at least one heating power energy unit, particularly arranged in a respective heating power energy unit housing, the heating power transferring elements, heating power transferring element carrier or heating power transferring element support. In other words, the lower casing and the cooking support may form a closed unit comprising all essential parts of the cooking hob. Thereby the lower casing may comprise fastening means for fastening and/or arranging the cooking hob on top of or in a cutout of a work plate.

Thereby, preferably, a power transferring element may be arranged below a cooking support. Preferably, the one or more heating power transferring elements are arranged in an upper portion of the lower casing of the cooking hob. A power transferring element may be arranged and supported by one or more heating power transferring element carrier or heating power transferring element support, preferably the power transferring element attached and/or arranged on said carrier or support. A housing comprising an energy power unit may be arranged below one or more heating power transferring element carrier or heating power transferring element supports. Thereby, preferably a heating power transferring element carrier or heating power transferring element support with the supported heating power-transferring element may advantageously be arranged on top of and/or attached to such housing of an energy power unit.

For conducting the cooking process, particularly a heating step, a cooking appliance, particularly the lower casing, comprises at least one heating power-transferring element. Said heating power-transferring element is provided for transferring heating power to the foodstuff or cooking liquid, preferably contained in a cookware item.

Preferably, the at least one heating power transferring element is an electric heating element, in particular an induction heating element, particularly induction coil, and/or radiant heating element. The heating power provided by a heating power-transferring element may be preferably provided electrically. Preferably, the heating power may be provided by a heat-generating magnetic field, more particularly an induction field. Accordingly, the cooking hob of the present invention preferably is an induction hob.

Preferably, a heating power-transferring element in the form of an induction coil comprises a planar conductive winding wire, particularly a copper wire. Preferably, an induction coil comprises at least one magnetic field supporting element, e.g. a ferrite element. Preferably, said at least one magnetic field supporting element, particularly at least one ferrite element, is arranged below the plane of the conductive winding wire. Said at least one magnetic field supporting element, particularly ferrite element, is advantageous in establishing and/or supporting the high frequent alternating magnetic field of the induction coil. Said magnetic field supporting element, particularly if arranged below the conductive winding wire, may be glued to or supported by ferrite support elements, e.g. snap fit connectors or the like.

Preferably, an induction coil comprises a shielding element, e.g. a mica sheet. The shielding element preferably is adapted to the form of the planar conductive winding wire or the form of at least two planar conductive winding wires of at least two adjacently arranged coils. The shielding element preferably is provided above the at least one magnetic field supporting element, particularly at least one ferrite element. The shielding element preferably in its main function is a support for the planar conductive wire windings of the coil. However, additionally the shielding element, particularly mica sheet, may also shield temperature radiated from the above, e.g. resulting from a heated up pot bottom.

In the cooking hob of the present invention the at least one heating power transferring element is preferably arranged and/or mounted on a heating power transferring element carrier or heating power transferring element support, particularly comprised in the lower casing. It is particularly preferred that a carrier made of aluminum sheet metal supports the heating power-transferring element. Particularly, the cooking hob of the present invention may comprise power transferring element carrier or heating power transferring element support to support one heating power transferring element, however, it is also considered herein that one power transferring element carrier or heating power transferring element support is provided to support more than one heating power transferring element.

In a preferred embodiment of the present invention, two heating power transferring elements are arranged on and supported by one common heating power transferring element carrier. Particularly at least two induction coils are arranged on and supported by one common induction coil carrier plate.

The heating power transferring element carrier or heating power transferring element support may be advantageously supported by or on a housing of the heating energy power unit.

Particularly, at least one of, preferably all of, the heating power transferring elements of an cooking hob of the invention, more particularly an induction coil of an induction hob, may be arranged below a cooking support, particularly a cooking surface in form of a plate element, and particularly within the lower casing, in order to provide the heat for a heating step to a heating zone of the cooking support and to the bottom side of a cookware item and foodstuff, respectively, when placed on said heating zone.

A cooking support of a cooking hob of the invention, particularly of an induction hob of the invention, preferably comprises at least one heating zone. Such heating zone as referred to herein, preferably refers to a portion of the cooking support, particularly cooking surface, which is associated with one heating power transferring element, e.g. a radiant heating element or an induction coil, which is arranged at, preferably below, the cooking support, e.g. the glass ceramic plate. Particularly, in an embodiment according to which the cooking hob of the present invention is an induction hob, it is preferred that such heating zone refers to a portion of the cooking support, which is associated with at least one induction coil. Thereby, the heating power transferring elements associated with a heating zone are preferably configured such that the same heating power of the associated heating power transferring elements is transferred to the heating zone. Preferably, the heating zone thus refers to a portion of the cooking support to which the same heating power of the associated at least one heating power transferring element is transferred.

In addition, the cooking hob of the present invention, may particularly be configured such that in one operation mode one or more than one heating zones form one cooking zone and/or are combined to one cooking zone, respectively. A cooking zone may be particularly provided as at least a portion of the cooking surface. Particularly, such cooking zone is associated with at least one heating zone. Additionally, or alternatively, a cooking zone may be associated with more than one heating zone. Particularly, a cooking zone may be associated with an even number, particularly two, four, six, eight or ten, more particularly two, heating zones. Alternatively, a cooking zone may be associated with an uneven number, particularly three, five, seven or nine, more particularly three, heating zones.

Preferably, the cooking hob of the present invention is configured such that a cooking zone comprises one or more than one heating zones, which can be driven with the same or different power, frequency or heating level.

In the present invention, it is preferred that in at least one operation mode of the cooking hob according to the present invention is configured such that a cooking zone comprises at least two, preferably two, heating zones, driven by the same power, frequency or heating level. Particularly, such cooking zone comprises or is associated with at least two, preferably two, heating power-transferring elements.

Additionally, or alternatively, the cooking hob of the present invention may be configured such that the number of heating zones associated with one cooking zone may vary and/or may be adjustable dependent on the needs of the cook and/or the size, form or kind of cookware placed on the cooking surface.

Particularly, a cooking hob according to the present invention, preferably an electric hob, such as an induction hob, may comprise at least one heating power energy unit. A heating power energy unit as used herein, preferably provides energy to at least one of, preferable a number of, the heating power transferring elements such that the heating power transferring element is capable of transferring heating power for heating up the foodstuff or cooking liquid. A heating power energy unit of an induction hob, for example, may provide energy in the form of a high frequency alternating current to a heating power-transferring element in the form of an induction coil, which transfers heating power in the form of a magnetic field to a suitable cookware item. For such purpose, a heating power energy unit may comprise at least one associated power circuit mounted and/or arranged on at least one printed circuit board. Preferably, a heating power energy unit is supported and arranged in a housing, preferably a plastic housing, preferably arrangable in and adapted to the lower casing. This allows easy manufacturing and modularization.

Particularly, the housing may comprise supporting elements for supporting the heating power transferring element carrier or heating power transferring element support. Particularly, such supporting elements may comprise elastic means, e.g. springs or silicon elements, for elastically supporting the heating power transferring element carrier or heating power transferring element support, and particularly advantageous in pressing a heating power-transferring element onto the bottom surface of the cooking support plate, which particularly is a glass ceramic plate.

Particularly, the heating power energy unit, and particularly the associated power circuit, may be configured to be connected to at least one, preferably two phases of a mains supply. A cooking hob according to the present invention thereby comprises at least one, preferably two or three heating power energy units, connected to one or two, preferably one phases of the mains supply each.

Preferably, a heating power energy unit may comprise at least—one associated power circuit, particularly in the form of an at least one heating power generator, for generating heating power and supplying heating power-transferring elements with heating power, particularly for providing heating power to the at least one heating zone. Thereby the power circuit particularly may be provided in the form of a half-bridge configuration or a quasi-resonant configuration.

It will be immediately understood that the heating power energy unit may thus comprise one heating power generator for providing heating power to more than one heating zone, each associated with at least one heating power transferring element.

Furthermore, the heating power energy unit may comprise one heating power generator comprising a single or pair of high frequency switching elements, in the following also referred to as power transistor.

In particular, the high frequency switching element is provided in the form of a semiconductor-switching element, particularly an IGBT element.

In case the heating power energy unit may comprise one heating power generator comprising a single high frequency switching element, the single switching element preferably forms part of associated power circuit, provided in the form of a or a part of a Quasi Resonant circuit.

In case that the heating power energy unit may comprise one heating generator comprises a pair of high frequency switching elements, said pair of high frequency switching elements preferably forms part of an associated power circuit, provided in the form of a or a part of a half-bridge circuit.

A person skilled in the art will immediately understand that the heat, generated by and/or radiated from particularly the heating power transferring elements, the heating power energy unit and/or the cookware item, particularly the bottom thereof, may have also disadvantageous effects, particularly regarding safety and proper functioning. Particularly, the heating power energy unit, more particularly power circuits comprising switching elements, may generate a significant amount of heat being disadvantage for the safety and proper functioning of the cooking hob. For this reason, the cooking hob comprises at least one cooling means. Particularly, said cooling means is adapted for cooling down the electric and/or electronic elements. Particularly, the heating power energy unit may comprise such cooling means. Such cooling means may comprise at least one of a fan, a cooling channel, a cooling body, preferably from a metal, particularly aluminium, cooling air-guiding means, cooling air deflection means and the like. Particularly, the cooking hob of the present invention may comprise such cooling means for cooling at least one heating power generator or a part thereof, particularly to at least one single or pair of high frequency switching elements. More particularly, such cooling means may comprise a cooling body, preferably arranged in the air path of a cooling fan, and thermally connected to at least one heating power generator or a part thereof, particularly to at least one single or pair of high frequency switching elements. Thereby it is preferred that the cooling means comprises at least one fan for generating an air stream through the cooling channel. Preferably, the cooling channel and/or cooling body extends horizontally through the cooking hob. For example, the cooling channel and/or cooling body extends over a substantial part of the horizontal width of the cooking hob.

The cooking hob according to the present invention preferably further comprises a control unit. Such control unit is preferably operatively connected with the heating power energy unit to control at least one operational parameter of the cooking hob, particularly an operational parameter of the heating power energy unit. Furthermore, the control unit comprises a user interface at least for receiving a command input of a user. This advantageously allows the user to control at least one operational parameter of the cooking hob, particularly an operational parameter of the heating power energy unit. Moreover, the control unit, and particularly a user interface if present, may be operatively connected to other appliances or interfaces, e.g. a suction hood, a voice control device, a server, a remote interface, a cloud-computing source or the like.

Accordingly, the household cooking hob according to the present invention comprises at least one electric and/or electronic element. Particularly, said at least one electric and/or electronic element comprises a heating power energy unit and/or control unit or parts thereof.

Particularly, the at least one electric and/or electronic element of the household cooking hob of the present invention may be part of an at least one heating energy power unit, preferably mounted and/or arranged on a power board and/or a power generating circuit mounted on a printed circuit board (PCB).

Such at least one electric and/or electronic element may be, for example, selected from the group comprising a heating power generator, filter coils, EMC filters, rectifier, switching elements, like IGBTs, relays, or the like.

According to an aspect, the invention refers to an induction-based cooking appliance, specifically an induction hob. The induction-based cooking appliance comprises multiple heating power transferring elements, specifically induction coils, and multiple heating power energy units, specifically power boards, for powering said heating power transferring elements. Each heating power energy unit comprises one or more power transistors for providing electrical power to the heating power transferring elements.

According to a further or alternative aspect, the invention refers to an induction-based cooking appliance, specifically an induction hob, comprising multiple heating power transferring elements, specifically induction coils, and multiple heating power energy units, specifically power boards, for powering said heating power transferring elements, each heating power energy unit comprising one or more switching devices, in particular power switching devices, more in particular power transistors, for providing electrical power to the heating power transferring elements.

According to an embodiment and/or in a first alternative, power transistors included in said multiple heating power energy units are wide bandgap transistors comprising semiconductor materials with a bandgap greater than 2 eV. Said power transistors are configured to be operated in a first frequency range and in a second frequency range different to the first frequency range.

Preferably, the frequency span from the lowest frequency of the first frequency range to the highest frequency of the second frequency range is 50 kHz or higher, specifically 60 kHz, 70 kHz, 80 kHz, 90 kHz or 100 kHz.

According to a further and/or alternative embodiment, said switching devices, in particular power switching devices, more in particular power transistors, included in said multiple heating power energy units are wide bandgap switching devices, in particular wide bandgap power switching devices, more in particular wide bandgap transistors, comprising more in particular semiconductor materials with a bandgap greater than 2 eV.

According to a particular and/or alternative embodiment, said switching devices, in particular power switching devices, more in particular power transistors, are configured to be operated in a first frequency range.

According to a particular and/or alternative embodiment, said switching devices, in particular power switching devices, more in particular power transistors, are configured to be operated in a first frequency range and in a second frequency range different to the first frequency range.

According to a particular and/or alternative embodiment, said switching devices, in particular power switching devices, more in particular power transistors, are configured to be operated in a first frequency range and in a second frequency range at least essentially identical, in particular identical, to the first frequency range.

In a second alternative, a first heating power transferring element is powered by a heating power energy unit comprising a first type of power transistor adapted to be operated in a first frequency range and a second heating power transferring element is powered by a heating power energy unit comprising a second type of power transistor adapted to be operated in a second frequency range different to the first frequency range.

It is worth mentioning that the switching device, in particular power transistor, is in particular adapted to be switched at a frequency included in the respective frequency range in order to initiate an oscillation in an oscillation circuit in which the respective heating power transferring element is included.

According to a further and/or alternative embodiment and/or in a second alternative, a first heating power transferring element is powered by a heating power energy unit comprising a first type of switching device, in particular power switching device, more in particular power transistor, adapted to be operated in a first frequency range and a second heating power transferring element is powered by a heating power energy unit comprising a second type of switching device, in particular power switching device, more in particular power transistor, adapted to be operated in a second frequency range different or at least essentially identical, in particular identical, to the first frequency range.

Said appliance is or can be advantageous because due to using either wide bandgap power switching devices, in particular wide bandgap power switching devices, more in particular wide bandgap transistors, which can be operated in a broad frequency band or different types of switching devices, in particular power switching devices, more in particular power transistors, which are structurally configured to be operated in different frequency ranges, it is possible to choose the frequencies of first and second heating power transferring element such that a greater frequency gap can be obtained. Thereby acoustic noise can be lowered significantly.

According to an embodiment, said wide bandgap transistors are transistors based on silicon carbide (SiC), gallium nitride (GaN) or Boron nitride (BN). Using those materials it is possible to design power electronics, specifically transistors which provide switching operation in a broad frequency band, specifically in a frequency band of 50 kHz or higher, specifically 60 kHz, 70 kHz, 80 kHz, 90 kHz or 100 kHz.

According to an embodiment, the first and/or second type of power transistor is an insulated-gate bipolar transistor, specifically a silicon-based insulated-gate bipolar transistor. Said transistor may have a bandgap lower than 2 eV. Such type of power transistor can be driven in a first frequency range below the second frequency range.

According to an embodiment, the first and/or second type of power transistor is metal-oxide-semiconductor field-effect transistor, specifically a silicon-carbide metal-oxide-semiconductor field-effect transistor. For example, said second type of power transistor may be a bandgap transistor including semiconductor material comprising silicon carbide (SiC), gallium nitride (GaN) or Boron nitride (BN). Such type of power transistor can be driven in a second frequency range above the first frequency range.

According to an embodiment, the first frequency range and the second frequency range are separated from each other by a frequency gap of at least 10 kHz. By using such frequency gap, it is possible to choose the frequency of the first type of power transistor close to the upper boundary of the first frequency range and the frequency of the second type of power transistor close to the lower range of the second frequency range and also get sufficient frequency spacing.

According to an embodiment, the first and/or second type of switching device, in particular power switching device, more in particular power transistor, is configured to be powered in a frequency range of 20 kHz to 50 kHz. Also further frequency ranges in the neighbourhood of before-mentioned range are possible, e.g. 30 kHz to 60 kHz, etc. Said frequency is preferably suitable for insulated-gate bipolar transistors.

According to an embodiment, the second type of switching device, in particular power transistor, is configured to be powered in a frequency range of 60 kHz to 90 kHz. Also further frequency ranges in the neighbourhood of before-mentioned range are possible, e.g. 70 kHz to 100 kHz, etc. Said frequency is preferably suitable for metal-oxide-semiconductor field-effect transistors, for example based on wide bandgap materials like silicon carbide (SiC), gallium nitride (GaN) or Boron nitride (BN).

According to an embodiment, the first heating power transferring element is arranged next to the second heating power transferring element, specifically directly next to the second heating power transferring element. So even if the heating power transferring elements are neighbored quite closely, acoustic noise generation can be avoided due to frequency spreading.

According to an embodiment, said wide bandgap switching devices, in particular transistors, are configured to be operated in a frequency range from 20 kHz to 90 kHz. Also further frequency ranges in the neighbourhood of before-mentioned range are possible, e.g. 30 kHz to 100 kHz, etc. Thereby, the switching devices, in particular power transistors, can be operated in a broader frequency range than silicon-based power transistors which allows a broader spreading of switching frequencies in order to reduce acoustic noise.

According to a further aspect, the invention relates to a method for operating an induction-based cooking appliance, specifically an induction hob. According to a first alternative, said multiple heating power energy units comprise power transistors which are wide bandgap transistors comprising semiconductor materials with a bandgap greater than 2 eV, wherein at least one of said power transistors is operated in a first frequency range and another one of said power transistors is operated in a second frequency range different to the first frequency range, specifically having no overlap with the first frequency range. According to a second alternative, the first type of power transistor included in the first heating power energy unit is operated in a first frequency range and the second type of power transistor included in the second heating power energy unit is operated in the second frequency range, said second frequency range being a frequency range having no overlap with the first frequency range.

According to a further aspect, the invention relates to a method for operating an induction-based cooking appliance, specifically an induction hob.

According to a first alternative, said multiple heating power energy units comprise power transistors which are wide bandgap transistors comprising semiconductor materials with a bandgap greater than 2 eV, wherein at least one of said power transistors is operated in a first frequency range and another one of said power transistors is operated in a second frequency range different to the first frequency range, specifically having no overlap with the first frequency range.

According to a further alternative or embodiment, said multiple heating power energy units comprise switching devices, in particular power switching devices, more in particular power transistors, which are wide bandgap transistors, more in particular comprising semiconductor materials with a bandgap greater than 2 eV, wherein at least one of said switching devices, in particular power switching devices, more in particular power switching devices, in particular power transistors, is operated in a first frequency range and another one of said switching devices, in particular power switching devices, more in particular power transistors, is operated in a second frequency range different or at least essentially identical, in particular identical, to the first frequency range.

According to a second alternative, the first type of power transistor included in the first heating power energy unit is operated in a first frequency range and the second type of power transistor included in the second heating power energy unit is operated in the second frequency range, said second frequency range being a frequency range having no overlap with the first frequency range.

According to a further alternative or embodiment, a first heating power energy unit comprises a first type of switching device, in particular power switching device, more in particular power transistor, and a second heating power energy unit comprises a second type of switching device, in particular power switching device, more in particular power transistor, and the first type of switching device, in particular power switching device, more in particular power transistor, included in the first heating power energy unit is operated in a first frequency range and the second type of switching device, in particular power switching device, more in particular power transistor included in the second heating power energy unit is operated in the second frequency range, said second frequency range being a frequency range having no overlap with the first frequency range or being at least essentially identical, in particular identical to the first frequency range.

According to an embodiment of the method, said wide bandgap transistors are transistors based on silicon carbide (SiC), gallium nitride (GaN) or Boron nitride (BN). Using those materials it is possible to design power electronics, specifically transistors which provide switching operation in a broad frequency band, specifically in a frequency band of 50 kHz or higher, specifically 60 kHz, 70 kHz, 80 kHz, 90 kHz or 100 kHz.

According to an embodiment of the method, the first type of power transistor is a transistor, having a semiconductor material with a bandgap lower than 2 eV, specifically a silicon-based insulated-gate bipolar transistor. Such type of power transistor can be driven in a first frequency range below the second frequency range.

According to an embodiment of the method, the second type of power transistor is a wide bandgap transistor, specifically a transistor including a semiconductor material selected from the following list of semiconductor materials: silicon carbide, gallium nitride or boron nitride. Such type of power transistor can be driven in a second frequency range above the first frequency range.

According to an embodiment of the method, the first and/or second type of switching device, in particular power switching device, more in particular power transistor, is powered in a frequency range of 20 kHz to 50 kHz. Also further frequency ranges in the neighbourhood of before-mentioned range are possible, e.g. 30 kHz to 60 kHz, etc. Said frequency is preferably suitable for silicon-based insulated-gate bipolar transistors.

According to an embodiment of the method, the second type of switching device, in particular power transistor, is powered in a frequency range of 60 kHz to 90 kHz. Also further frequency ranges in the neighbourhood of before-mentioned range are possible, e.g. 70 kHz to 100 kHz, etc. Said frequency is preferably suitable for wide bandgap transistors including a semiconductor material selected from the group of silicon carbide, gallium nitride or boron nitride.

According to an embodiment of the method, said switching devices, in particular wide bandgap transistors, are configured to be operated in a frequency range from 20 kHz to 90 kHz. Also further frequency ranges in the neighbourhood of before-mentioned range are possible, e.g. 30 kHz to 100 kHz, etc. So, by using switching devices, in particular wide bandgap transistors as power transistors in the heating power energy units, the frequency ranges can be spread over a larger frequency range, i.e. one switching device, in particular wide bandgap transistor, can be operated at the lower frequency range portion and another switching device, in particular wide bandgap transistor, can be operated at the upper frequency range portion.

The term "power transistor type" as used in the present disclosure may refer to a certain class of power transistors which are characterized by a certain structural features like transistor material, transistor structure etc.

In particular, the term power transistor may also refer to other types of switching devices. Examples for switching devices, in particular power switching devices, are insulated gate bipolar transistors, IGBTs, bipolar junction transistors, BJTs, field-effect transistors, metal-oxide-silicon transistors, metal-oxide-semiconductor field-effect transistors, MOSFETs, power diodes and/or thyristors.

The term "essentially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
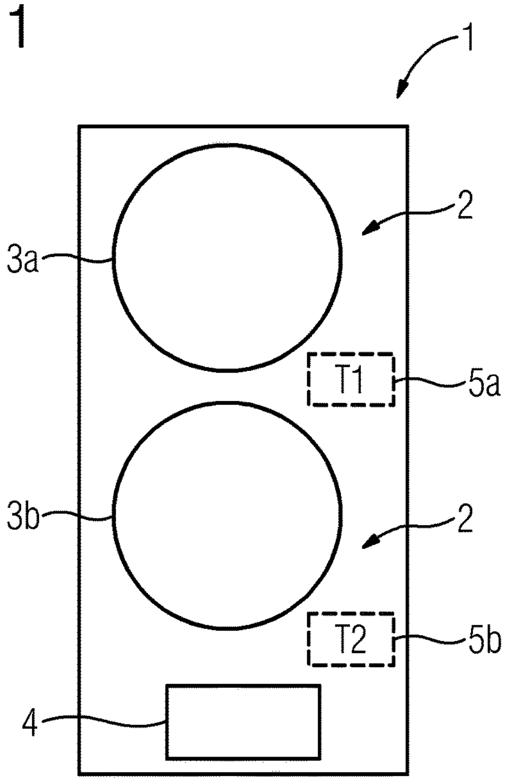
FIG. 1 shows an example top view on a cooking appliance comprising multiple heating zones.

The present invention will now be described more fully with reference to the accompanying drawings, in which example embodiments are shown. The embodiments in the figures may relate to preferred embodiments, while all elements and features described in connection with embodiments may be used, as far as appropriate, in combination with any other embodiment and feature as discussed herein, in particular related to any other embodiment discussed further above. However, this invention should not be construed as limited to the embodiments set forth herein. Throughout the following description similar reference numerals have been used to denote similar elements, parts, items or features, when applicable.

The features of the present invention disclosed in the specification, the claims, examples and/or the figures may both separately and in any combination thereof be material for realizing the invention in various forms thereof.

FIG. 1 illustrates a schematic diagram of an electric induction hob 1.

The induction hob 1 comprises multiple heating zones 2. Each heating zone 2 may be, for example, associated with one or more heating power transferring elements 3*a*, 3*b*, specifically, one or more induction coils. In the present embodiment, each heating zone 2 is associated with a single heating power transferring element 3*a*, 3*b*. However, according to other embodiments, a heating zone 2 may be associated with multiple heating power transferring elements.

In addition, the cooking appliance 1 comprises a user interface 4, based on which a user may control the induction hob 1. For example, based on the user interface 4, the user may control the power level of the heating zones 2.

For powering the heating power transferring elements 3*a*, 3*b*, two or more heating power energy units 5*a*, 5*b* are provided. For example, a first heating power energy unit 5*a* may be electrically coupled with a first heating power transferring element 3*a* in order to provide electrical power to said first heating power transferring element 3*a*. Similarly, a second heating power energy unit 5*b* may be electrically coupled with a second heating power transferring element 3*b* in order to provide electrical power to said second heating power transferring element 3*b*.

In order to generate a pulsed electrical signal based on which a resonant circuit, in which the respective heating power transferring elements 3*a*, 3*b* are included, is excited, the heating power energy units 5*a*, 5*b* comprise switching devices, in particular power switching devices, in particular power transistors.

In a first embodiment, the heating power energy units 5*a*, 5*b* comprise different types of switching devices, in particular power transistors. More in detail, the first heating power energy unit 5*a* comprises a first type T1 of switching device, in particular power transistor, whereas the second heating power energy unit 5*b* comprises a second type T2 of switching device, in particular power transistor.

Figure 2:
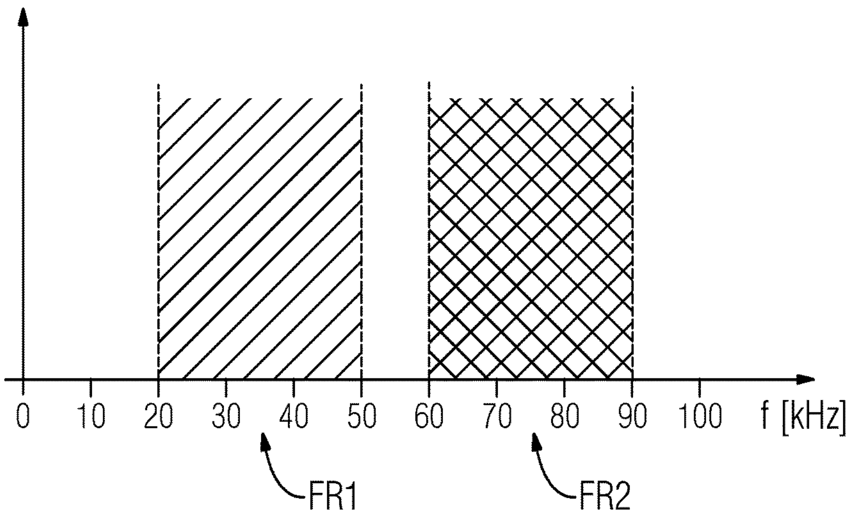
FIG. 2 shows a frequency diagram comprising a first and a second frequency range.

The power transistor of first type T1 is configured to be operated in a first frequency range FR1. In contrary thereto, the power transistor of second type T2 is configured to be operated in a second frequency range FR2 which is different to the first frequency range FR1. Preferably, said first frequency range FR1 covers a frequency band which is totally different to frequency band covered by the second frequency range FR2. So, in other words, the first and second frequency ranges FR1, FR2 do not overlap, as shown in FIG. 2.

In an embodiment, a first heating power transferring element 3*a* is powered by a heating power energy unit 5*a* comprising a first type T1 of power switching device, in particular power transistor, adapted to be operated in a first frequency range FR1 and a second heating power transferring element 3*b* is powered by a heating power energy unit 5*b* comprising a second type T2 of power switching device, in particular power transistor, adapted to be operated in a second frequency range FR2 different or at least essentially identical, in particular identical, to the first frequency range FR1.

In an embodiment, the first frequency range FR1 is at least essentially identical to the second frequency range FR2.

According to an embodiment, the first type T1 of power transistor may be an insulated gate bipolar transistor (IGBT). Preferably, a silicon-based insulated gate bipolar transistor may be used. The insulated gate bipolar transistor may be, for example, configured to be operated in a first frequency range FR1 which covers the frequency band between 20 KHz and 50 KHz. Such silicon-based power transistors are preferable for cost reasons.

Furthermore, the second type T2 of power transistor may be a metal-oxide-semiconductor field-effect transistor (MOSFET). Said power transistor may comprise a wide bandgap semiconductor material, for example selected from the list of silicon carbide, gallium nitride and boron nitride. Preferably, a silicon-carbide metal-oxide-semiconductor field-effect transistor may be used. The metal-oxide-semiconductor field-effect transistor may be, for example, configured to be operated in a second frequency range FR2 which comprise higher frequencies than the first frequency range FR1. Preferably, the second frequency range FR2 covers the frequency band between 60 KHz and 90 KHz.

Said switching devices, in particular power switching devices, may be insulated gate bipolar transistors, IGBTs, bipolar junction transistors, BJTs, field-effect transistors, metal-oxide-silicon transistors, metal-oxide-semiconductor field-effect transistors, MOSFETs, power diodes and/or thyristors.

By using different types of transistors, it is possible to define separate frequency windows for adjacent heating power transferring elements 3*a*, 3*b* and thereby spread the frequencies at which the heating power transferring elements 3*a*, 3*b* are operated. Thereby, acoustic interference noise can be avoided or at least mitigated.

Within the respective frequency range FR1, FR2, the operation frequency at which the respective heating power transferring element 3*a*, 3*b* is driven, can be chosen according to the respective operation conditions.

According to another embodiment, both heating power energy units 5*a*, 5*b* arranged next to each other comprise wide bandgap power transistors. Wide bandgap power transistors are capable to be operated in a broad frequency range specifically in a range from 20 kHz to 90 kHz. Using wide bandgap power transistors in both heating power energy units 5*a*, 5*b* arranged next to each other may be disadvantageous in view of costs. However, such configuration provides a greater flexibility regarding switching frequency.

In an embodiment, said switching devices, in particular power switching devices, more in particular power transistors, included in said multiple heating power energy units 5*a*, 5*b* are wide bandgap power switching devices, in particular wide bandgap transistors, comprising more in particular semiconductor materials with a bandgap greater than 2 eV.

Said switching devices, in particular power switching devices, may be insulated gate bipolar transistors, IGBTs, bipolar junction transistors, BJTs, field-effect transistors, metal-oxide-silicon transistors, metal-oxide-semiconductor field-effect transistors, MOSFETs, power diodes and/or thyristors.

In an embodiment, said power switching devices, in particular power transistors, are configured to be operated in a first frequency range FR1 and in a second frequency range FR2 different or at least essentially identical, in particular identical, to the first frequency range FR1.

In an embodiment, the first frequency range FR1 is at least essentially identical to the second frequency range FR2.

In an embodiment, the first frequency range FR1 is identical to the second frequency range FR2.

In an embodiment, said switching devices, in particular power switching devices, in particular power transistors, are configured to be operated in a second frequency range FR2.

In an embodiment, said switching devices are wide bandgap switching devices and/or based on wide band gap material that work on high frequency range and/or provide switching operation in a broad frequency band, specifically in a frequency band of 50 kHz or higher, specifically 60 kHz, 70 kHz, 80 kHz, 90 kHz or 100 kHz.

In an embodiment, said switching devices, in particular power switching devices, in particular power transistors, are configured to be operated in a first frequency range FR1.

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS

1 induction hob
2 heating zone
3*a*, 3*b* heating power transferring element
4 user interface
5*a*, 5*b* heating power energy unit
FR1 first frequency range
FR2 second frequency range
T1 first type of switching device, in particular power transistor
T2 second type of switching device, in particular power transistor

The invention claimed is:

1. An induction-based cooking appliance comprising:
a first heating power transferring element;
a first heating power energy unit adapted for providing electrical power to the first heating power transferring element, the first heating power energy unit comprising a first power switching device, in particular a first power transistor, adapted to be operated in a first frequency range;
a second heating power transferring element; and
a second heating power energy unit adapted for providing electrical power to the second heating power transferring element, the second heating power energy unit comprising a second power switching device, in particular a second power transistor, adapted to be operated in a second frequency range that is different, identical, or essentially identical to the first frequency range,
wherein the first power switching device and/or second power switching device is a wide bandgap power switching device, in particular a wide bandgap transistor, comprising a semiconductor material with a bandgap greater than 2 eV.

2. The induction-based cooking appliance according to claim 1, wherein said first power switching device and second power switching device are insulated gate bipolar transistors, IGBTs, bipolar junction transistors, BJTs, field-effect transistors, metal-oxide-silicon transistors, metal-oxide-semiconductor field-effect transistors, MOSFETs, power diodes, and/or thyristors.

3. The induction-based cooking appliance according to claim 1, wherein said wide bandgap transistor comprises silicon carbide, gallium nitride, or boron nitride.

4. The induction-based cooking appliance according to claim 1, wherein the first power switching device or second power switching device is a transistor having a material with a bandgap lower than 2 eV, specifically a silicon-based insulated-gate bipolar transistor.

5. The induction-based cooking appliance according to claim 1, wherein the first frequency range and the second frequency range are separated from each other by a frequency gap of at least 10 kHz.

6. The induction-based cooking appliance according to claim 1, wherein one of the first power switching device and second power switching device is configured to be powered in a frequency range of 20 kHz to 50 kHz.

7. The induction-based cooking appliance according to claim 1, wherein one of the first power switching device and second power switching device is configured to be powered in a frequency range of 60 kHz to 90 kHz.

8. The induction-based cooking appliance according to claim 1, wherein the first heating power transferring element is arranged next to the second heating power transferring element, specifically directly next to the second heating power transferring element.

9. The induction-based cooking appliance according to claim 1, wherein said first power switching device and second power switching device are configured to be operated in a frequency range from 20 kHz to 90 KHz.

10. A method for operating the cooking appliance according to claim 1, the method comprising operating the first power switching device in the first frequency range and operating the second power switching device in the second frequency range.

11. The method according to claim 10, wherein said wide bandgap transistor comprises silicon carbide, gallium nitride, or boron nitride.

12. The method according to claim 10, wherein the first power switching device is a transistor having a material with a bandgap lower than 2 eV, specifically a silicon-based insulated-gate bipolar transistor.

13. The method according to claim 10, wherein the second power switching device is a wide bandgap transistor, specifically a transistor including silicon carbide, gallium nitride, or boron nitride.

14. The method according to claim 10, wherein the first power switching device is powered in a frequency range of 20 kHz to 50 kHz and the second power switching device is powered in a frequency range of 60 kHz to 90 KHz.

15. The method according to claim 10, wherein said first power switching device and second power switching device are configured to be operated in a frequency range from 20 kHz to 90 kHz, and/or
wherein said first power switching device and second power switching device are insulated gate bipolar transistors, IGBTs, bipolar junction transistors, BJTs, field-effect transistors, metal-oxide-silicon transistors, metal-oxide-semiconductor field-effect transistors, MOSFETs, power diodes, and/or thyristors.

16. The induction-based cooking appliance according to claim 1, wherein the first frequency range is different from and does not overlap with the second frequency range.

17. The induction-based cooking appliance according to claim 16, wherein the first frequency range is 20 kHz to 50 kHz and the second frequency range is 60 kHz to 90 KHz.

18. An induction-based cooking appliance comprising:
a first induction coil;
a second induction coil;
a first wide bandgap transistor configured to operate in a first frequency range and to selectively provide electrical power to the first induction coil; and
a second wide bandgap transistor configured to operate in a second frequency range and to selectively provide electrical power to the second induction coil,
wherein at least the first wide bandgap transistor or the second wide bandgap transistor has a bandgap greater than 2 eV,
wherein the first frequency range is 20 kHz to 50 kHz,
wherein the second frequency range is 60 kHz to 90 kHz, and wherein the first induction coil is physically arranged directly next to the second induction coil within the induction-based cooking appliance.

19. The induction-based cooking appliance according to claim 18, wherein the first wide bandgap transistor and the second wide bandgap transistor are each selected from a group consisting of: an insulated gate bipolar transistor, a bipolar junction transistors, a field-effect transistor, a metal-oxide-silicon transistor, a metal-oxide-semiconductor field-effect transistors, a power diode, or a thyristors.

20. The induction-based cooking appliance according to claim 18, wherein the first wide bandgap transistor and the second wide bandgap transistor are based on silicon carbide, gallium nitride, or boron nitride.

* * * * *